(12) United States Patent
Jambunathan et al.

(10) Patent No.: US 9,264,497 B2
(45) Date of Patent: Feb. 16, 2016

(54) SYSTEM AND METHOD FOR HOSTING MOBILE DEVICES FOR TESTING IN A CLOUD COMPUTING ENVIRONMENT

(71) Applicant: Cognizant Technology Solutions India Pvt. Ltd., Chennai (IN)

(72) Inventors: Somasundaram Jambunathan, Chennai (IN); Ramakrishnan Venkatasubramanian, Chennai (IN)

(73) Assignee: COGNIZANT TECHNOLOGY SOLUTIONS INDIA PVT. LTD. (IN)

( * ) Notice: Subject to any disclaimer, the term of this patent is extended or adjusted under 35 U.S.C. 154(b) by 80 days.

(21) Appl. No.: 14/178,713

(22) Filed: Feb. 12, 2014

(65) Prior Publication Data
US 2015/0180979 A1   Jun. 25, 2015

(30) Foreign Application Priority Data

Dec. 23, 2013   (IN) .......................... 6052/CHE/2013

(51) Int. Cl.
| | |
|---|---|
| H04L 9/32 | (2006.01) |
| G06F 11/30 | (2006.01) |
| G06F 12/14 | (2006.01) |
| G06F 7/04 | (2006.01) |
| G06F 11/00 | (2006.01) |
| H04L 29/08 | (2006.01) |
| H04L 12/26 | (2006.01) |
| H04L 29/06 | (2006.01) |
| G06F 21/57 | (2013.01) |
| G06F 21/64 | (2013.01) |

(52) U.S. Cl.
CPC .......... H04L 67/141 (2013.01); H04L 43/0811 (2013.01); H04L 63/0428 (2013.01); H04L 67/10 (2013.01); H04L 67/42 (2013.01); G06F 21/57 (2013.01); G06F 21/64 (2013.01); H04L 63/08 (2013.01)

(58) Field of Classification Search
CPC ..... H04L 63/08; H04L 63/0428; G06F 21/64; G06F 21/57
USPC .................. 713/150, 168, 187; 726/22, 26, 34
See application file for complete search history.

(56) References Cited

U.S. PATENT DOCUMENTS

| | | | |
|---|---|---|---|
| 7,881,491 B2 | 2/2011 | Mizrachi | |
| 8,972,624 B2 * | 3/2015 | Kanigicherla et al. | .......... 710/28 |

(Continued)

FOREIGN PATENT DOCUMENTS

EP    2348477    7/2011

OTHER PUBLICATIONS

Oleksii Starov, "Cloud Platform for Research Crowdsourcing in Mobile Testing".

*Primary Examiner* — Aravind Moorthy
(74) *Attorney, Agent, or Firm* — Cantor Colburn LLP

(57) ABSTRACT

A system and method for hosting one or more mobile devices on one or more servers in a cloud computing environment for testing mobile applications is provided. The system comprises client virtualization managers to collect and send information related to the mobile devices to the servers and mobile devices virtualization managers to receive and use the information to establish a connection with the client virtualization managers for accessing and hosting the mobile devices. Further, the system comprises a server application to facilitate testers to select a mobile device from a list of the hosted mobile devices and an automation tool interface handler to virtualize Universal Serial Bus (USB) port of local machines connected to the servers, connect the selected mobile device to the virtualized USB port of the local machines and facilitate testing of the mobile applications on the locally available mobile device by test automation tools.

15 Claims, 6 Drawing Sheets

(56) References Cited

U.S. PATENT DOCUMENTS

| | | | |
|---|---|---|---|
| 2007/0006296 A1* | 1/2007 | Nakhjiri et al. | 726/15 |
| 2008/0082698 A1* | 4/2008 | Schnaare | 709/250 |
| 2010/0058359 A1* | 3/2010 | Ferlitsch | 719/321 |
| 2011/0072421 A1* | 3/2011 | Parry et al. | 717/168 |
| 2013/0097179 A1* | 4/2013 | Moshrefi et al. | 707/748 |
| 2014/0123114 A1* | 5/2014 | Navalur et al. | 717/127 |
| 2014/0208097 A1* | 7/2014 | Brandwine et al. | 713/156 |

\* cited by examiner

SYSTEM AND METHOD FOR HOSTING MOBILE DEVICES FOR TESTING IN A CLOUD COMPUTING ENVIRONMENT

FIELD OF THE INVENTION

The present invention relates generally to hosting mobile devices on one or more servers in a cloud computing environment. More particularly, the present invention provides a system and method for hosting one or more mobile devices on one or more servers in a cloud computing environment for testing.

BACKGROUND OF THE INVENTION

With the advancements in the telecommunication industry, numerous mobile devices, operating systems and mobile applications have emerged. Organizations providing mobile applications have to ensure that mobile applications provided by them function in a desired manner on various mobile devices. For this reason, the mobile applications are tested on various mobile devices operating on different platforms prior to commercialization.

Conventionally, various organizations procure a large number of different mobile devices for the purpose of testing mobile applications. However, procuring such a large number of mobile devices for the purpose of testing mobile applications is an expensive proposition. Further, regular introduction of new models and maintenance of existing mobile devices results in cost escalations. In addition, procurement of mobile devices often gets delayed during shipment which leads to project delays.

Another way for testing mobile applications is by using third party device simulators and cloud device infrastructure. However, existing testing tools available with the organizations undertaking testing projects cannot be used for testing mobile applications as only specific testing tools are compatible with the third party device simulators and the cloud device infrastructure. The testers at the organizations are therefore restricted to using the testing tools provided by the device simulators and cloud device infrastructure. Therefore, the testers have to acquire additional skill set for using the testing tools compatible with the third party device simulators and cloud device infrastructure. This leads to cost escalations and project delays.

In light of the above, there is a need for a system and method for hosting mobile devices on one or more servers in a cloud environment. Further, there is a need for a system and method to facilitate use of existing testing tools on the hosted mobile devices for testing mobile applications. Furthermore, there is a need for a system and method for testing mobile applications which is cost efficient.

SUMMARY OF THE INVENTION

A system and computer-implemented method for hosting one or more mobile devices on one or more servers in a cloud computing environment is provided. The system comprises one or more client applications configured to provide options to one or more users for hosting the one or more mobile devices on the one or more servers. The system further comprises one or more client virtualization managers, residing in the one or more mobile devices, configured to collect and send information related to the one or more mobile devices to the one or more servers if the one or more users select the option corresponding to hosting. Furthermore, the system comprises one or more mobile devices virtualization managers, residing in the one or more servers, configured to receive the information related to the one or more mobile devices and establish a connection with each of the one or more client virtualization managers using the received information to access and host the one or more mobile devices. The system also comprises a server application configured to facilitate one or more end-users to access the one or more hosted mobile devices and initiate one or more hosted mobile device specific operations.

In an embodiment of the present invention, the one or more client virtualization managers comprise a client device enumerator configured to identify and collect the information related to the mobile device. The one or more client virtualization managers further comprise a client connection manager configured to establish the connection for hosting the mobile device and maintaining the connection between the hosted mobile device and the one or more servers using the collected information. Furthermore, the one or more client virtualization managers comprise a device session manager configured to initiate and maintain a session between the hosted mobile device and a server once the connection is established. Also, the one or more client virtualization managers comprise a client events handler configured to facilitate encrypting and decrypting of one or more requests associated with the one or more hosted mobile device specific operations when the session is in progress and forward the one or more encrypted and decrypted requests to a client kernel services module, residing in the mobile device, for performing the one or more device specific operations associated with the one or more encrypted and decrypted requests.

In an embodiment of the present invention, the information related to the one or more mobile devices include at least one of: model number, manufacturing details, Operating System (OS) version details, location details and carrier details. In an embodiment of the present invention, the one or more hosted mobile device specific operations associated with the one or more requests include at least one of: placing a call, sending an SMS message, downloading and using an application and any other hosted mobile device specific operation.

In an embodiment of the present invention, the server application facilitates the one or more end-users to use the one or more hosted mobile devices by providing options to the one or more end-users to select the one or more hosted mobile devices from a list of hosted mobile devices, wherein the list is rendered on the server application by the one or more mobile devices virtualization managers. The server application further facilitates the one or more end-users to use the one or more hosted mobile devices by initiating a session with the client virtualization manager of the selected mobile device. Furthermore, the server application facilitates the one or more end-users to use the one or more hosted mobile devices by sending one or more requests, corresponding to hosted mobile device specific operations initiated by the one or more end-users, to the client virtualization manager once the session is initiated.

In an embodiment of the present invention, the one or more end-users access the one or more hosted mobile devices via one or more local machines connected to the one or more servers. In an embodiment of the present invention, the one or more mobile devices virtualization managers, residing in the one or more servers, comprise a server enumerator configured to receive information related to the one or more mobile devices from the one or more client virtualization managers. The one or more mobile devices virtualization managers further comprise a server connection manager configured to ensure connectivity of the server with the one or more mobile devices using the received information. Furthermore, the one or more mobile devices virtualization managers comprise a server session manager configured to maintain one or more sessions between the one or more hosted mobile devices connected to the server. The one or more mobile devices virtualization managers also comprise a server events handler configured to encrypt and decrypt one or more requests associated with the one or more hosted mobile device specific operations when the one or more sessions are in progress.

The computer-implemented method for hosting one or more mobile devices on one or more servers in a cloud computing environment, via program instructions stored in a memory and executed by a processor comprises providing one or more options, via a client application, to one or more users for hosting the one or more mobile devices on the one or more servers. The computer-implemented method further comprises capturing and sending information related to the one or more mobile devices to the one or more servers if the one or more users select the option corresponding to hosting. Furthermore, the computer-implemented method comprises receiving, at the one or more servers, the information related to the one or more mobile devices. The computer-implemented method also comprises establishing a connection with the one or more mobile devices using the received information to access and host the one or more mobile devices on the one or more servers. In addition, the computer-implemented method comprises facilitating one or more end-users to access the one or more hosted mobile devices via one or more local machines, connected to the one or more servers, to perform one or more hosted mobile device specific operations.

In an embodiment of the present invention, facilitating the one or more end-users to access the one or more hosted mobile devices via one or more local machines comprise encrypting and decrypting one or more requests associated with one or more sessions between the one or more hosted mobile devices and the one or more servers after the connection has been established and forwarding the one or more encrypted and decrypted requests to a client kernel services module, residing in the mobile device, for performing the one or more device specific operations associated with the one or more encrypted and decrypted requests.

In an embodiment of the present invention, hosting the one or more mobile devices on the one or more servers comprises rendering the received information related to the one or more mobile devices on a server application once the connection is established to facilitate the one or more end-users to access the one or more hosted mobile devices.

A computer program product for hosting one or more mobile devices on one or more servers in a cloud computing environment is provided. The computer program product comprises a non-transitory computer-readable medium having computer-readable program code stored thereon, the computer-readable program code comprising instructions that when executed by a processor, cause the processor to provide one or more options, via a client application, to one or more users for hosting the one or more mobile devices on the one or more servers. The processor further captures and sends information related to the one or more mobile devices to the one or more servers if the one or more users select the option corresponding to hosting. Furthermore, the processor receives, at the one or more servers, the information related to the one or more mobile devices. In addition, the processor establishes a connection with the one or more mobile devices using the received information to access and host the one or more mobile devices on the one or more servers. Also, the processor facilitates one or more end-users to access the one or more hosted mobile devices via one or more local machines, connected to the one or more servers, to perform one or more hosted mobile device specific operations.

A system and computer-implemented method for hosting one or more mobile devices on one or more servers in a cloud computing environment for testing one or more mobile applications is provided. The system comprises one or more client virtualization managers, residing in the one or more mobile devices, configured to collect and send information related to the one or more mobile devices to the one or more servers to facilitate hosting of the one or more mobile devices. The system further comprises one or more mobile devices virtualization managers, residing in the one or more servers, configured to receive and use the information related to the one or more mobile devices to establish a connection with the one or more client virtualization managers for accessing and hosting the one or more mobile devices. Furthermore, the system comprises a server application configured to facilitate one or more testers to select a mobile device from a list of the one or more hosted mobile devices rendered on the server application. In addition, the system comprises an automation tool interface handler configured to virtualize Universal Serial Bus (USB) port of one or more local machines connected to the one or more servers, connect the selected mobile device to the virtualized USB port of the one or more local machines, such that the selected mobile device is locally available for use on the one or more local machines and facilitate testing of the one or more mobile applications on the locally available mobile device by one or more test automation tools.

In an embodiment of the present invention, the system further comprises one or more client applications configured to provide one or more options to one or more users for hosting the one or more mobile devices on the one or more servers.

In an embodiment of the present invention, the one or more client virtualization managers comprise a client device enumerator configured to identify and collect the information related to the mobile device. The one or more client virtualization managers further comprise a client connection manager configured to establish the connection for hosting the mobile device and maintaining the connection between the hosted mobile device and the one or more servers using the collected information. Furthermore, the one or more client virtualization managers comprise a device session manager configured to initiate and maintain a session between the hosted mobile device and a server once the connection is established. In addition, the one or more client virtualization managers comprise a client events handler configured to facilitate encrypting and decrypting one or more requests associated with one or more hosted mobile device specific operations when the session is in progress and forward the one or more encrypted and decrypted requests to a client kernel services module, residing in the mobile device, for performing the one or more hosted mobile device specific operations associated with the one or more encrypted and decrypted requests.

In an embodiment of the present invention, the one or more hosted mobile device specific operations associated with the one or more requests include at least one of: placing a call, sending an SMS message, downloading and using an application, testing of the one or more mobile applications and any other device specific operation initiated by the one or more test automation tools.

In an embodiment of the present invention, the server application facilitates the one or more test automation tools to use the hosted mobile device selected by the one or more testers for testing by initiating the session with the client virtualization manager of the hosted mobile device to be used for testing of the one or more mobile applications and sending the one or more requests, associated with the testing of the one or more mobile applications, to the client virtualization manager once the session is initiated, wherein the one or more requests correspond to the one or more hosted mobile device specific operations initiated by the one or more test automation tools.

In an embodiment of the present invention, the one or more mobile devices virtualization managers comprise a server enumerator configured to receive information related to the one or more mobile devices from the one or more client virtualization managers. Further, the one or more mobile devices virtualization managers comprise a server connection manager configured to ensure connectivity of the server with the one or more hosted mobile devices using the received information. Furthermore, the one or more mobile devices virtualization managers comprise a server session manager configured to initiate and maintain the session between the one or more hosted mobile devices connected to the server. In addition, the one or more mobile devices virtualization managers comprise a server events handler configured to encrypt and decrypt the one or more requests associated with the one or more hosted mobile device specific operations initiated by the one or more test automation tools when the session is in progress.

In an embodiment of the present invention, the one or more test automation tools reside in the one or more local machines. In an embodiment of the present invention, the one or more test automation tools are connected to the one or more local machines.

The computer-implemented method for hosting one or more mobile devices on one or more servers in a cloud computing environment for testing one or more mobile applications, via program instructions stored in a memory and executed by a processor, comprises capturing and sending information related to the one or more mobile devices to the one or more servers to facilitate hosting of the one or more mobile devices. The computer-implemented method further comprises receiving and using, at the one or more servers, the information related to the one or more mobile devices to establish a connection for accessing and hosting the one or more mobile devices. Furthermore, the computer-implemented method comprises facilitating one or more testers to select, via one or more local machines, a mobile device from a list of the one or more hosted mobile devices rendered on a server application. The computer-implemented method also comprises virtualizing Universal Serial Bus (USB) port of the one or more local machines connected to the one or more servers. In addition, the computer-implemented method comprises connecting the selected mobile device to the virtualized USB port of the one or more local machines, such that the selected mobile device is locally available for use on the one or more local machines. Further, the computer-implemented method comprises facilitating testing of the one or more mobile applications on the locally available mobile device by one or more test automation tools.

In an embodiment of the present invention, the computer-implemented method further comprises providing one or more options, via a client application, to one or more users for hosting the one or more mobile devices on the one or more servers.

In an embodiment of the present invention, facilitating testing of the one or more mobile applications on the locally available mobile device by the one or more test automation tools comprise encrypting and decrypting one or more requests associated with one or more hosted mobile device specific operations when a session is in progress, wherein the one or more hosted mobile device specific operations are initiated by the one or more test automation tools and forwarding the one or more encrypted and decrypted requests to a client kernel services module, residing in the mobile device, for performing the one or more hosted mobile device specific operations associated with the one or more encrypted and decrypted requests.

A computer program product for hosting one or more mobile devices on one or more servers in a cloud computing environment for testing one or more mobile applications is provided. The computer program product comprises a non-transitory computer-readable medium having computer-readable program code stored thereon, the computer-readable program code comprising instructions that when executed by a processor, cause the processor to capture and send information related to the one or more mobile devices to the one or more servers to facilitate hosting of the one or more mobile devices. The processor further receives and uses, at the one or more servers, the information related to the one or more mobile devices to establish a connection for accessing and hosting the one or more mobile devices. Furthermore, the processor facilitates one or more testers to select, via one or more local machines, a mobile device from a list of the one or more hosted mobile devices rendered on a server application. In addition, the processor virtualizes Universal Serial Bus (USB) port of the one or more local machines connected to the one or more servers. The processor further connects the selected mobile device to the virtualized USB port of the one or more local machines, such that the selected mobile is locally available for use on the one or more local machines. Also, the processor facilitates testing of the one or more mobile applications on the locally available mobile device by one or more test automation tools.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for hosting one or more mobile devices on one or more servers in a cloud computing environment is described herein. The invention provides for a system and method for facilitating use of existing testing tools on the hosted mobile devices for testing mobile applications.

Further, the invention provides for a system and method for testing mobile applications which is cost efficient.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
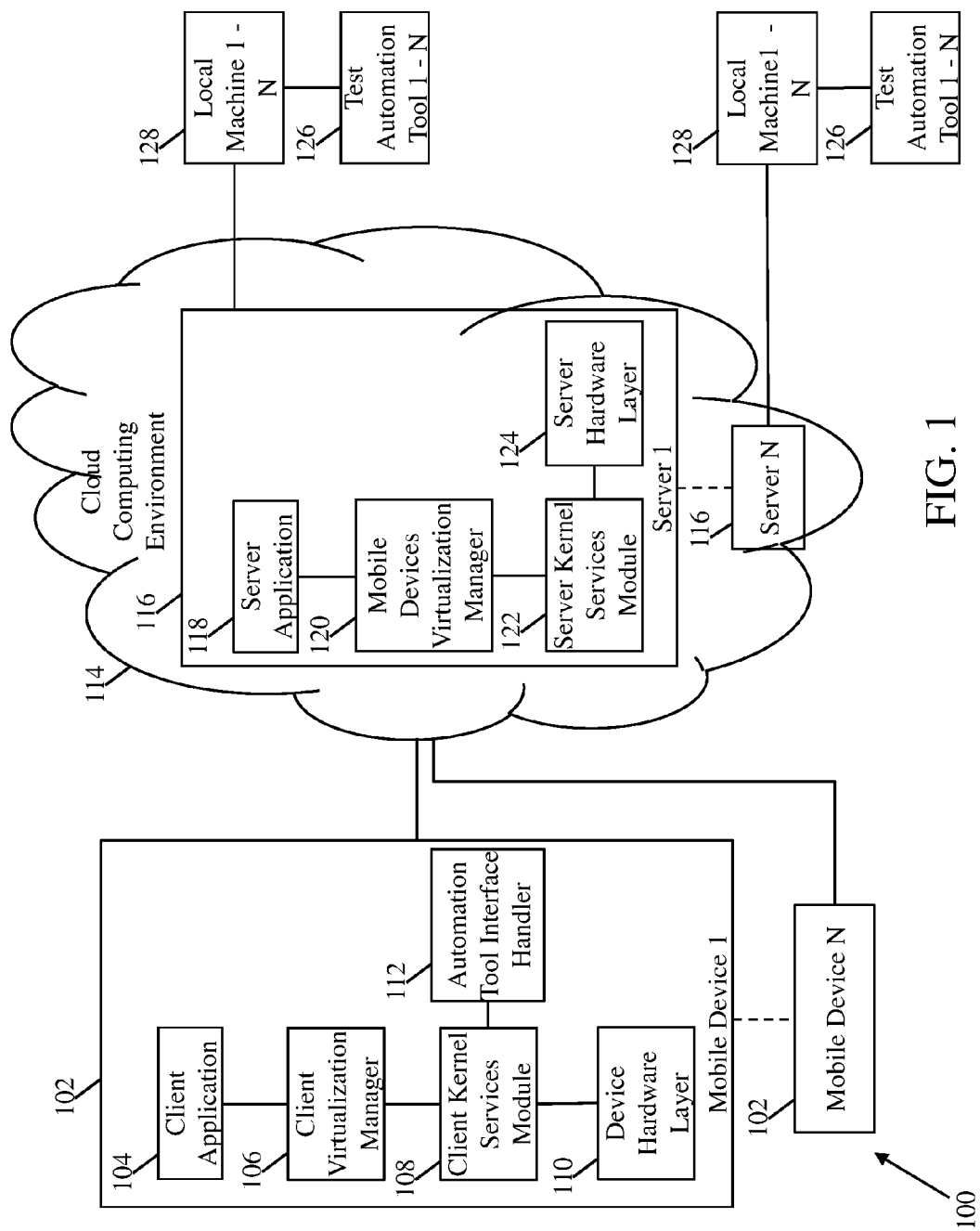
FIG. 1 is a block diagram illustrating a system for hosting mobile devices on a server in a cloud computing environment, in accordance with an embodiment of the present invention.

FIG. 1 is a block diagram illustrating a system 100 for hosting one or more mobile devices on one or more servers in a cloud computing environment, in accordance with an embodiment of the present invention. The system 100 comprises one or more mobile devices 102 and one or more servers 116 in a cloud computing environment 114.

The one or more mobile devices 102 are hosted on the one or more servers 116 in the cloud computing environment 114 to facilitate sharing with various devices at different locations. The one or more mobile devices 102 include, but are not limited to, laptops, palmtops, netbooks, mobile phones, tablets and Personal Digital Assistants (PDAs). In an embodiment of the present invention, the one or more mobile devices 102 are shared by hosting on the one or more servers 116 in the cloud computing environment 114 to facilitate one or more testers at different locations to test newly developed mobile applications via one or more local machines 128. The one or more mobile devices 102 comprise a client application 104, a client virtualization manager 106, a client kernel services module 108, a client hardware layer 110 and an automation tool interface handler 112.

The client application 104 is an interface configured to provide options to one or more users for hosting the one or more mobile devices 102 on the one or more servers 116. The one or more users are individuals such as, but not limited to, members of an organization, on-line community and individuals willing to let their mobile devices to be used for testing. In an embodiment of the present invention, the one or more users access the client application 104 residing in the one or more mobile devices 102. In another embodiment of the present invention, the one or more users connect the one or more mobile devices 102 via Universal Serial Bus (USB) or WiFi to a local system. Once the one or more mobile devices 102 are connected to the local system having internet connection, the client application 104 residing on the local system is launched for hosting the one or more connected mobile devices 102. The one or more users access the client application 104 and select the option for hosting the mobile device 102. The client application 104 then forwards the request for hosting the mobile device 102 to the client virtualization manager 106.

The client virtualization manager 106 is configured to host the mobile device 102 on the one or more servers 116. The client virtualization manager 106 handles the requests received from the client application 104 forwarded by the one or more users. On receiving the requests from the client application 104, the client virtualization manager 106 collects and sends information related to the mobile device, input operations and output operations of the mobile device to the one or more servers 116 to facilitate hosting. The information related to the one or more mobile devices includes, but is not limited to, model number, manufacturing details, Operating System (OS) version details, location details and carrier details. The information related to the mobile device is received by one or more mobile devices virtualization managers 120 residing in the one or more servers 116. The received information related to the mobile device is then used by the one or more mobile devices virtualization managers 120 to establish a connection with the client virtualization manager 106 of the mobile device 102 to access and host the mobile device 102. Further, the received information is also provided to a server application 118 to facilitate hosting on the one or more servers 116. The client virtualization manager 106 also receives requests from one or more end-users via the one or more servers 116 for accessing and using the hosted mobile device 102. Further, the client virtualization manager 106 decrypts the received request from the one or more end-users routed through the one or more servers 116. The decrypted request is forwarded to the client kernel services module 108 for translation to data processing instructions. The client virtualization manager 106 is discussed in detail in later sections of the specification.

The client kernel services module 108 is configured to manage input and output operations of the mobile device 102 by interacting with the device hardware layer 110. The client kernel services module 108 is further configured to translate the encrypted and decrypted requests, received from the client virtualization manager 106, to data processing instructions. The data processing instructions are forwarded to the hardware modules of the mobile device 102 for performing the hosted mobile device specific operations associated with the encrypted and decrypted requests.

The automation tool interface handler 112 is configured to facilitate interaction between the hosted mobile device 102 and the one or more test automation tools 126. In an embodiment of the present invention, the one or more end-users use the hosted mobile devices 102 for the purpose of testing mobile applications. Further, the automation tool interface handler 112 facilitates connecting the hosted mobile device 102 to the one or more test automation tools 126 by virtualizing the USB port of the one or more local machines 128. The one or more local machines 128 are used by the one or more end-users to access the one or more servers 116. Once the USB port is virtualized, the hosted mobile device selected by the one or more end-users is connected to the virtualized USB port of the one or more local machines. The hosted mobile device is then locally available on the one or more local machines 128 for use by the one or more test automation tools, connected to the one or more local machines 126, for testing the one or more mobile applications. During testing of the one or more mobile applications by the one or more test automation tools 126, the client virtualization manager 106 facilitates encrypting and decrypting one or more requests associated with one or more hosted mobile device specific operations initiated by the one or more test automation tools 126.

The cloud computing environment 114 is an integral part of the network and is configured to connect and facilitate interaction between various mobile devices 102, servers 116 and the one or more local machines 128 over internet. The one or more servers 116 reside in the cloud computing environment 114.

The one or more servers 116 are configured to facilitate the one or more end-users to access the one or more hosted mobile devices 102 via the one or more local machines 128. In an embodiment of the present invention, the one or more end-users such as testers, developers and system administrators access the hosted mobile devices 102 for various purposes including, but not limited to, testing applications, developing applications, configuring the mobile devices, sharing and troubleshooting. The one or more servers 116 comprise server application 118, a mobile devices virtualization manager 120, a server kernel services module 122 and a server hardware layer 124.

The server application 118 is an interface configured to provide options to the one or more end-users to access the one or more mobile devices hosted on the one or more servers 116 and perform one or more hosted mobile device specific operations. In an embodiment of the present invention, the server application 118 provides options for, but not limited to, logging-in, accessing a list of hosted mobile devices, accessing information related to mobile devices, selecting one or more hosted mobile devices from the list, applying for tokens for mobile device access and choosing time-slot for accessing the mobile device. The information related to mobile devices include, but not limited to, model number, manufacturing details, OS and version details, location and carrier details. In an embodiment of the present invention, during operation, once the one or more end-users log-in to the server application, the server application 118 provides one or more options to the one or more end-users to select the one or more hosted mobile devices 102 from a list of hosted mobile devices rendered on the server application 118 by the mobile devices virtualization manager 120. In another embodiment of the present invention, the server application 118 provides options to the one or more testers to select a mobile device from the list of the one or more hosted mobile devices for testing the one or more mobile applications. The server application then facilitates initiating a session with the client virtualization manager 106 of the selected mobile device 102 via the mobile devices virtualization manager 120. The server application further facilitates forwarding the one or more requests corresponding to the one or more hosted mobile device specific operations initiated by the one or more end-users while accessing the hosted mobile device to the client virtualization manager 106 via the mobile devices virtualization manager 120.

The mobile devices virtualization manager 120 handles the requests from the server application 118 to perform the mobile device specific operation on the hosted one or more mobile devices 102. In an embodiment of the present invention, once the one or more end-users select a mobile device from the list of hosted mobile devices 102 via the server application 118, the mobile devices virtualization manager 120 initiates a session with the client virtualization manager 106 of the selected device. The mobile devices virtualization manager 120 then launches a device screen container. The device screen container facilitates streaming the mobile device screen of the selected mobile device 102 on a real-time basis to facilitate the one or more end-users to access the selected mobile device 102 and perform one or more hosted mobile device specific operations. In another embodiment of the present invention, the mobile devices virtualization manager 120 handles the requests from the server application 118 to perform the one or more hosted mobile device specific operations for testing the one or more mobile applications. In an embodiment of the present invention, the one or more hosted mobile device specific operations include, but are not limited, placing a call, sending an SMS message, download-ing and using the one or more mobile applications, testing the one or more mobile applications and any other hosted mobile device specific operations.

In an embodiment of the present invention, during operation, the mobile devices virtualization manager 120 receives and sends requests, from and to each client virtualization manager 106 of the one or more connected mobile devices 102, to facilitate the one or more end-users to use the hosted mobile devices 102. In another embodiment of the present invention, the mobile devices virtualization manager 120 receives and sends requests to facilitate the one or more test automation tools 126 to test the one or more mobile applications. The mobile devices virtualization manager 120 further facilitates encrypting and decrypting the requests. The mobile devices virtualization manager 120 is connected with the server kernel services module 122 to facilitate interaction with the server hardware layer 124. The mobile devices virtualization manager 120 is discussed in detail in later sections of the specification.

The server kernel services module 122 is configured to manage operations of the server 116 by interacting with the server hardware layer 124. The server kernel services module 122 is configured to translate requests related to input and output operations of the server 116 to data processing instructions for further processing by the hardware modules of the server 116.

The one or more test automation tools 126 are configured to facilitate testing of the one or more mobile applications. In an embodiment of the present invention, the one or more local machines 128 are connected to the one or more test automation tools 126. In another embodiment of the present invention, the one or more test automation tools reside in the one or more local machines 128. The automation tool interface handlers 112 facilitate virtualization of the USB port of the one or more local machines 128 to connect the hosted mobile devices 102 and the one or more test automation tools 126. Once the one or more hosted mobile devices 102 are locally available on the one or more local machines 128, the one or more mobile applications on the locally available mobile devices are tested by the one or more test automation tools 126. In an embodiment of the present invention, the server application 118 facilitates the one or more testers to select a mobile device from a list of the one or more mobile devices rendered on the server application 118. The server application 118 then initiates the session with the client virtualization manager 106 of the selected mobile device 102 to be used for testing of the one or more mobile applications. The server application 118 further facilitates sending the one or more requests, associated with the testing of the one or more mobile applications and initiated by the one or more test automation tools 126, to the mobile devices virtualization manager 120. The mobile devices virtualization manager 120 further forwards the one or more requests to the client virtualization manager 106 of the mobile device 102. In an embodiment of the present invention, if the one or more mobile devices 102 are disconnected by the one or more users, the events triggered at the one or more local machines 128 do not get transmitted to the one or more mobile devices 102. In such a scenario, the one or more end-users are notified of the disconnection via the server application 118.

Figure 2:
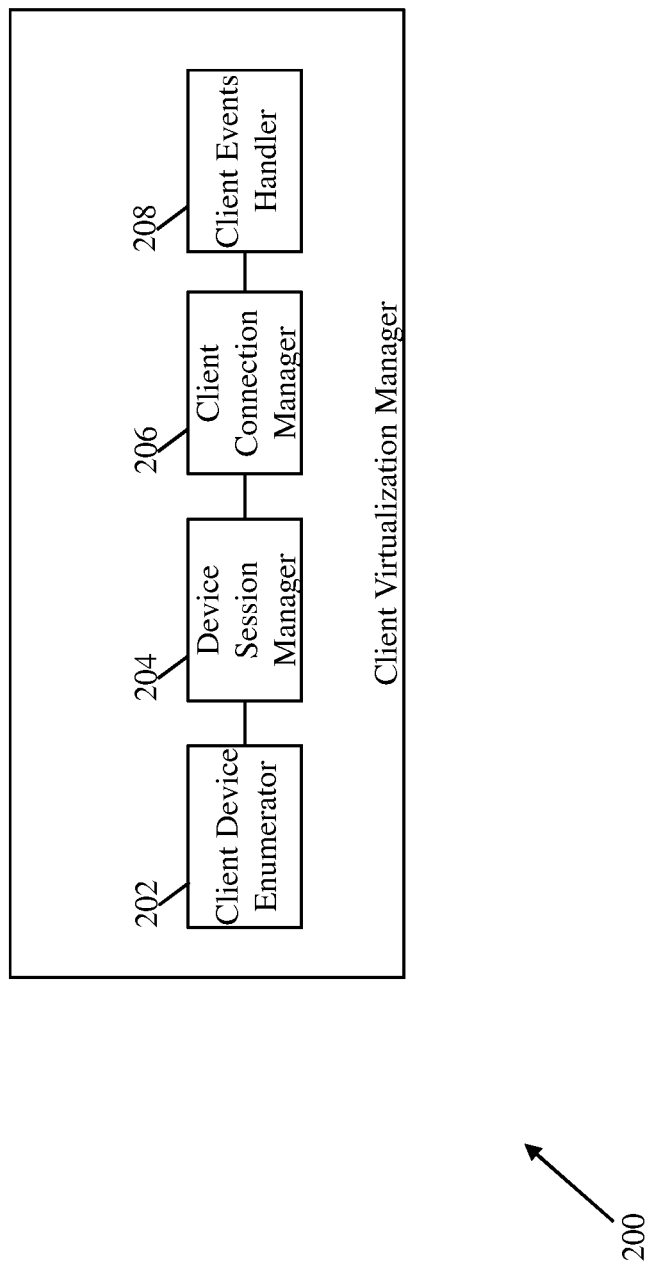
FIG. 2 is a detailed block diagram illustrating a client virtualization manager, in accordance with an embodiment of the present invention.

FIG. 2 is a detailed block diagram illustrating a client virtualization manager 200, in accordance with an embodiment of the present invention. The client virtualization manager 200 comprises a client device enumerator 202, a device session manager 204, a client connection manager 206 and a client events handler 208.

The client device enumerator 202 is configured to identify and collect information related to the mobile device 102. The information related to the mobile device 102 includes, but not limited to, manufacturer details, operating system details, version details and hardware details. In an embodiment of the present invention, the client device enumerator 202 sends the collected information to the mobile devices virtualization manager 120 (FIG. 1) on receiving the request for hosting from the one or more users via the client application 104 (FIG. 1). The collected information is sent to the mobile devices virtualization manager 120 (FIG. 1) to facilitate enumeration of the mobile device 102 (FIG. 1) with the one or more servers 116 (FIG. 1). Once the mobile device (FIG. 1) is enumerated with the one or more servers, the one or more end-users can access the mobile device 102 (FIG. 1) through the server application 118 (FIG. 1). Further, a server database handler residing in the mobile devices virtualization manager 120 (FIG. 1) handles the received information to facilitate hosting.

The device session manager 204 is configured to initiate and maintain one or more sessions between the mobile device 102 (FIG. 1) and the server 116 (FIG. 1). In an embodiment of the present invention, once the end-user using the server 116 (FIG. 1) selects a particular mobile device 102 (FIG. 1) from the list of hosted mobile devices connected to the server 116 (FIG. 1), a session is established between the selected mobile device 102 (FIG. 1) and the server 116 (FIG. 1) to facilitate the one or more end users to use the hosted mobile device 102 (FIG. 1). In an embodiment of the present invention, the device session manager 204 facilitates real-time streaming of the mobile device screen to the one or more servers 116 (FIG. 1) once the session is initiated.

The client connection manager 206 is configured to establish and maintain connections with the one or more servers 116 (FIG. 1) once the mobile device 102 (FIG. 1) is hosted on the one or more servers 116 (FIG. 1) using the information related to the mobile device collected by the client device enumerator 202. The client connection manager 208 also keeps a check on the availability of the mobile device 102 (FIG. 1). The client connection manager 208 further ensures that the mobile device 102 (FIG. 1) is not engaged in another session with another user. The client connection manager 206 also communicates with the device session manager 204 to facilitate initiating the one or more sessions once the connection with the one or more servers is established.

The client events handler 208 facilitates encrypting requests associated with the options selected by the one or more users via the client application 104 (FIG. 1). Further, the encrypted requests are sent to the one or more servers 116 (FIG. 1) by the client events handler 208. In an embodiment of the present invention, the client events handler 208 facilitates encrypting the requests to establish a connection with the one or more servers 116 (FIG. 1). In an embodiment of the present invention, the client events handler 208 also facilitates encrypting and decrypting the requests associated with the one or more hosted mobile device specific operations when a session is in progress and the mobile device 102 (FIG. 1) is being accessed by the server 116 (FIG. 1). The client events handler 208 further communicates with the client kernel services module 108 (FIG. 1) for forwarding the encrypted and decrypted requests. The client kernel services module 108 (FIG. 1) facilitates performing the hosted mobile device specific operations such as, but not limited to, placing a call, downloading and accessing one or more mobile applications, sending SMS messages, testing of the one or more mobile applications by the one or more test automation tools 126 (FIG. 1) and any other hosted mobile device specific operations associated with the one or more encrypted and decrypted requests. In an embodiment of the present invention, the hosted mobile device specific operations, associated with the one or more encrypted and decrypted requests, are initiated by the one or more end-users via the server application 118 (FIG. 1). In another embodiment of the present invention, the one or more hosted mobile device specific operations, associated with the one or more encrypted and decrypted requests, are initiated by the one or more test automation tools 126 (FIG. 1) for testing the one or more mobile applications.

Figure 3:
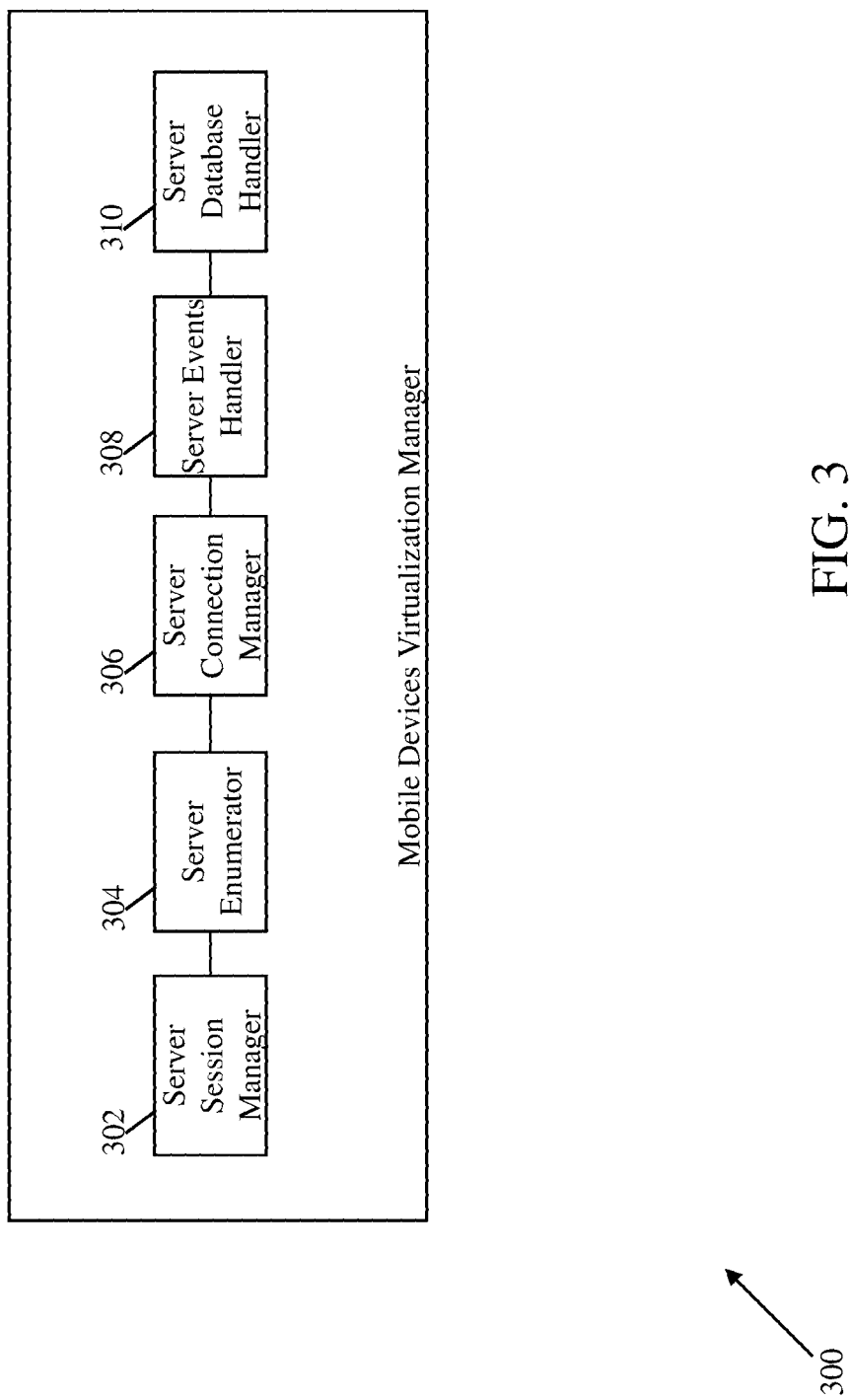
FIG. 3 is a detailed block diagram illustrating mobile devices virtualization manager, in accordance with an embodiment of the present invention.

FIG. 3 is a detailed block diagram illustrating a mobile devices virtualization manager 300, in accordance with an embodiment of the present invention. The mobile devices virtualization manager 300 comprises a server session manager 302, a server enumerator 304, a server connection manager 306, a server events handler 308 and a server database handler 310.

The server session manager 302 is configured to initiate and maintain sessions between the one or more hosted mobile devices 102 (FIG. 1) and the server 116 (FIG. 1). In an embodiment of the present invention, the server 116 (FIG. 1) is engaged in one or more sessions with the one or more mobile devices 102 (FIG. 1) simultaneously. The server session manager 302 manages all the active sessions and tracks device availability for establishing new sessions.

The server enumerator 304 is configured to enumerate the mobile devices 102 hosted on the cloud computing environment 114 (FIG. 1). The server enumerator 304 receives the information related to each of the mobile devices 102 from the respective client device enumerator 202 (FIG. 2). The server enumerator 304 also forwards the received information to the server application 118 (FIG. 1). The one or more end-users can then access the received information related to the mobile devices. Further, the server enumerator 304 interacts with the server session manager 302 for providing information required for establishing sessions.

The server connection manager 306 is configured to ensure connectivity of the server 116 (FIG. 1) with the one or more mobile devices 102 (FIG. 1) using the information received from the server enumerator 304.

The server events handler 308 is configured to encrypt and decrypt the one or more requests associated with the one or more hosted mobile device specific operations when the one or more sessions are in progress. In an embodiment of the present invention, the server events handler 308 encrypts the requests corresponding to the options selected, via the server application 118 (FIG. 1), by the one or more end-users. In another embodiment of the present invention, the server events handler 308 encrypts the one or more requests associated with the one or more hosted mobile device specific operations initiated by the one or more test automation tools 126 (FIG. 1) when the session is in progress. The server events handler 308 further transfers the encrypted requests to the client events handler 208 (FIG. 2) for undertaking the hosted mobile device specific operation associated with the request. The server events handler 308 is also configured to decrypt the one or more requests received from the one or more client events handlers 208 (FIG. 2).

The server database handler 310 is configured to handle information related to the one or more mobile devices, server and their usage. The client applications 104 (FIG. 1) residing in the one or more mobile devices 102 (FIG. 1) sends information related to the mobile device 102 (FIG. 1) through a web services messaging mechanism to the database handler 310.

Figure 4:
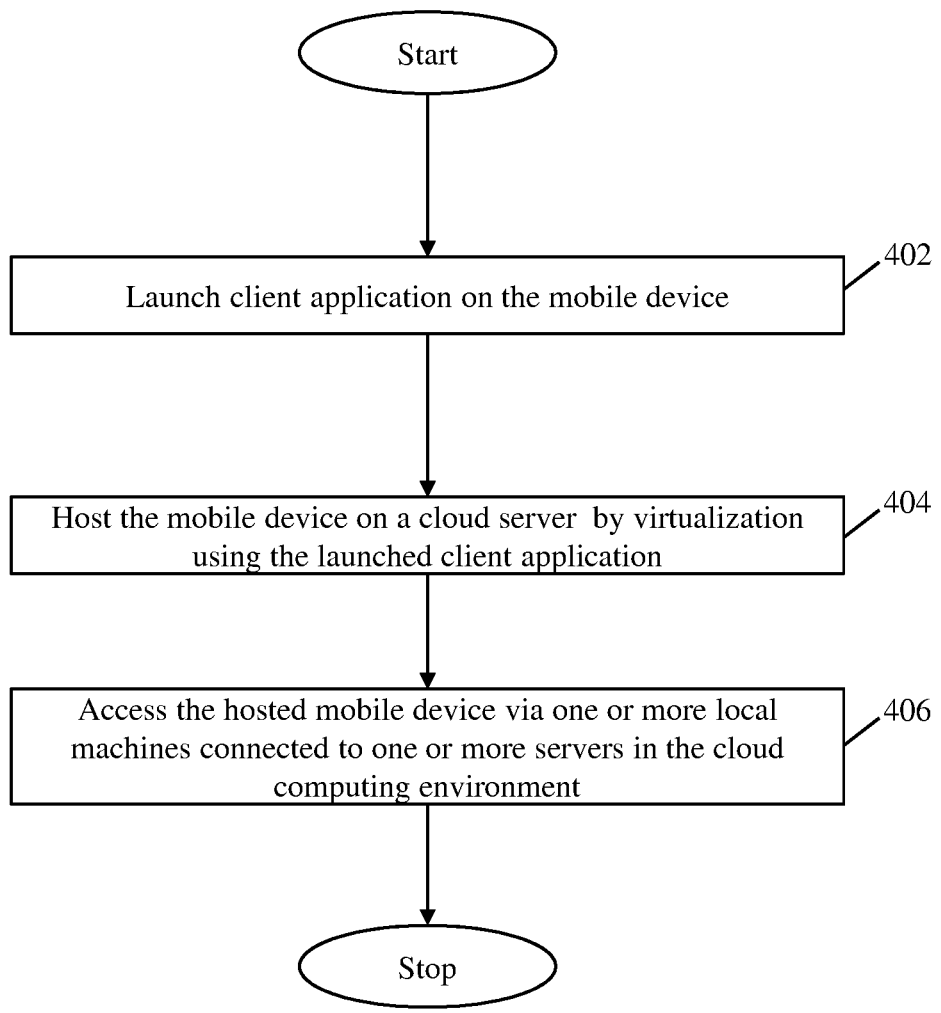
FIG. 4 represents a flowchart illustrating a method for hosting mobile devices on a server in a cloud environment, in accordance with an embodiment of the present invention.

FIG. 4 represents a flowchart illustrating a method for hosting mobile devices on a server in a cloud computing environment, in accordance with an embodiment of the present invention.

At step 402, a client application is launched on one or more mobile devices. The client application is an interface that provides options to one or more users to host the one or more mobile devices on a server in a cloud computing environment. The one or more mobile devices include, but are not limited to, laptops, palmtops, netbooks, mobile phones, tablets and Personal Digital Assistants (PDAs). The one or more users are individuals willing to host their mobile devices such as, but not limited to, members of an organization, employees of an enterprise developing mobile applications, on-line community and individuals letting mobile devices to be used for testing. In an embodiment of the present invention, the one or more users access the client application residing in the one or more mobile devices. In another embodiment of the present invention, the one or more users connect the one or more mobile devices to a local system. Once the one or more mobile devices are connected to the local system having internet connection, the client application residing on the local system is launched for hosting the one or more connected mobile devices.

At step 404, the one or more mobile devices are hosted on the one or more servers in a cloud computing environment by virtualization using the launched client application. On receiving requests from the client application for hosting the one or more mobile devices, information related to input operations and output operations and the one or more mobile devices is collected and sent to the one or more servers in a cloud computing environment. The information related to the one or more mobile devices include, but not limited to, manufacturer details, operating system details, version details, location details, carrier details and hardware details. The one or more servers then establish a connection with the one or more mobile devices using the received information to access and host the one or more mobile devices on the one or more servers. In an embodiment of the present invention, the one or more mobile devices are hosted on the one or more servers by rendering the received information related to the one or more mobile devices on a server application once the connection is established.

At step 406, the one or more hosted mobile devices are accessed by one or more end users via one or more local machines connected to the one or more servers to perform one or more hosted mobile device specific operations. In an embodiment of the present invention, one or more requests, associated with one or more sessions between the one or more hosted mobile devices and the one or more servers after the connection has been established, are encrypted and decrypted. The encrypted and decrypted requests are associated with the one or more hosted mobile device specific operations performed by the one or more end-users accessing the one or more hosted mobile devices via the one or more local machines. The encrypted and decrypted requests are forwarded to a client kernel services module, residing in the one or more mobile devices, for facilitating the one or more hosted mobile device specific operations associated with the encrypted and decrypted requests. In an embodiment of the present invention, the one or more hosted mobile device specific operations associated with the one or more requests include, but not limited to, placing a call, sending an SMS message, downloading and using one or more mobile applications, testing one or more mobile applications and any other hosted mobile device specific operation.

In an embodiment of the present invention, the one or more end users log in to a server application to access the one or more mobile devices hosted on the server via a local machine. On successfully logging, the end user is presented with a list of hosted mobile devices and information related to the mobile devices. The information related to the mobile device includes, but not limited to, OS details, version details, manufacturer details, and location and carrier details. The end-user then selects the mobile device to be accessed. Upon device selection, a device screen container is launched where the mobile device screen is streamed from the server. The end-user then uses the mobile device screen for different purposes such as testing, development, troubleshooting, sharing and configuring. Once the end-user starts using the mobile device, the server application translates the end-user actions into virtualized packets that are sent to the selected mobile device via the cloud computing environment over internet. The client application of the mobile device hands over the information received from the virtualized packets to a client kernel services module of the mobile device. Further, in response to the requests from the server, various events and input and output operations happening at the mobile device side are captured and sent back to the connected server via the cloud computing environment as data packets. The one or more end-users thereby use and perform various operations on the hosted mobile device on a real-time basis.

Figure 5:
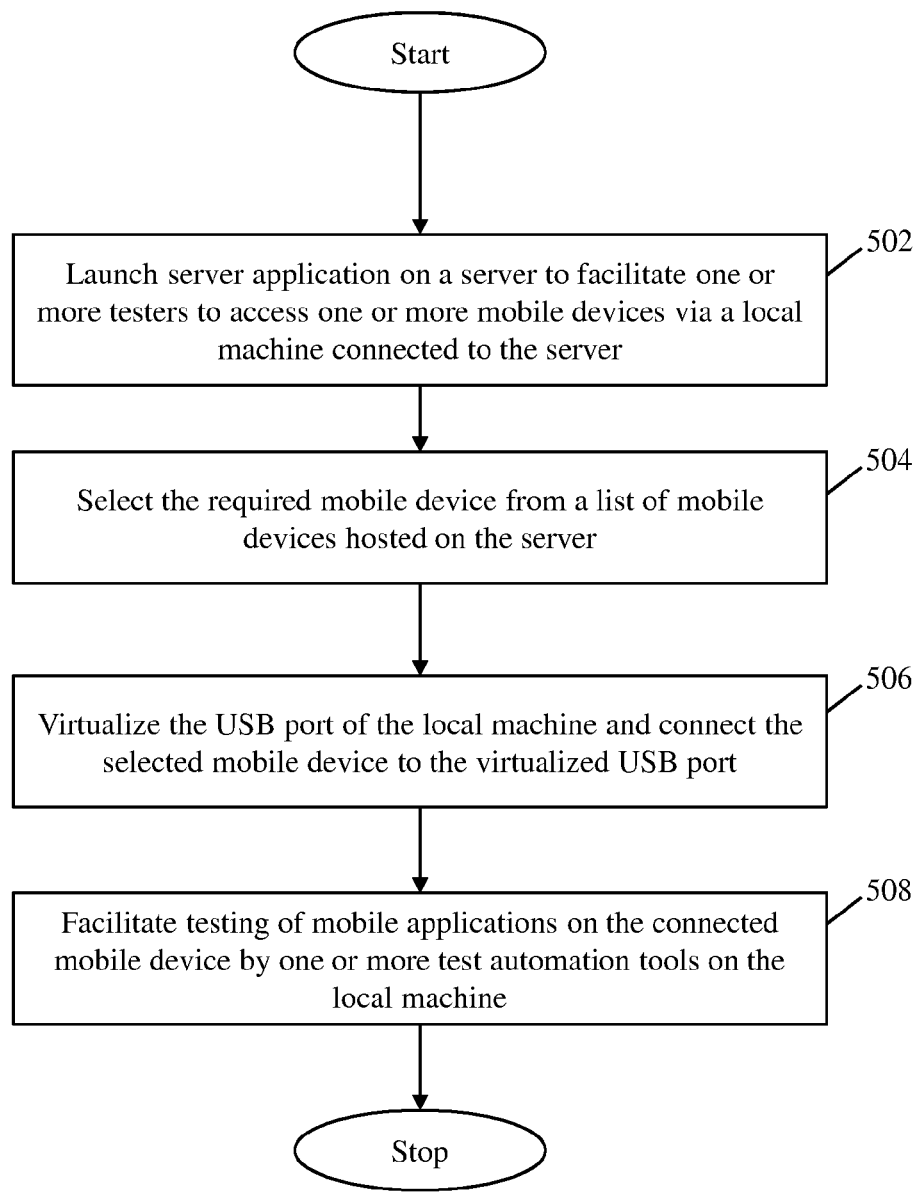
FIG. 5 represents a detailed flowchart to access mobile devices hosted on a server in a cloud environment for testing one or more mobile applications, in accordance with an embodiment of the present invention.

FIG. 5 is a detailed flowchart for accessing the mobile devices hosted on the server in a cloud computing environment for testing one or more mobile applications, in accordance with an embodiment of the present invention.

At step 502, the server application is launched to facilitate the one or more end users to access the one or more mobile devices hosted on the server in a cloud computing environment via the one or more local machines connected to the server. In an embodiment of the present invention, the one or more end users are testers. In an embodiment of the present invention, the server application is launched after the one or more testers provide authentication details for accessing the server application.

At step 504, the one or more testers are facilitated to select the mobile device required for testing of the one or more mobile applications from a list of the one or more hosted mobile devices rendered on the server application. In an embodiment of the present invention, after selection, the one or more testers apply for a token to access the selected mobile device for testing via the local machine. The token acts as a session identifier and facilitates secure exchange of information between the server and the selected mobile device. In an embodiment of the present invention, the one or more testers also select, via the local machine, the time slot for which the one or more testers require to use the hosted mobile device for testing.

At step 506, USB port of the local machine connected to the server is virtualized. Once the USB port of the local machine is virtualized, the selected mobile device is connected to the virtualized USB port of the local machine such that the selected mobile device is locally available for use on the local machine by one or more test automation tools.

At step 508, the one or more mobile applications are tested on the locally available mobile device by the one or more test automation tools. In an embodiment of the present invention, the one or more test automation tools use the locally available mobile device for testing the one or more mobile applications by running test scripts. In another embodiment of the present invention, the tester downloads, installs, tests functionality and ensures that the mobile application is working in a desired manner on the mobile device. In an embodiment of the present invention, one or more requests associated with one or more hosted mobile device specific operation when a session is in progress are encrypted and decrypted. Further, the one or more hosted mobile device specific operations associated with the one or more encrypted and decrypted requests are facilitated by forwarding the encrypted and decrypted requests to the client kernel services module residing in the mobile device. In an embodiment of the present invention, the one or more hosted mobile device specific operations associated with the one or more requests include, but are not limited to, placing a call, sending an SMS message, downloading and using the one or more mobile applications, testing of the one or more mobile applications and any other hosted mobile device specific operation performed by the one or more test automation tools.

During operation, the server application translates the testers' actions and operations performed by the one or more test automation tools on the mobile device screen into virtualized packets that are sent to the selected mobile device via the cloud computing environment over internet. The client application of the mobile device hands over the information received from the virtualized packets to the client kernel services module of the mobile device. In response, various events and input and output operations happening at the mobile device side are captured and sent back via the server as data packets. The one or more testers and the one or more test automation tools thereby use and perform various hosted mobile device specific operations on the hosted mobile device for testing the one or more mobile applications.

Figure 6:
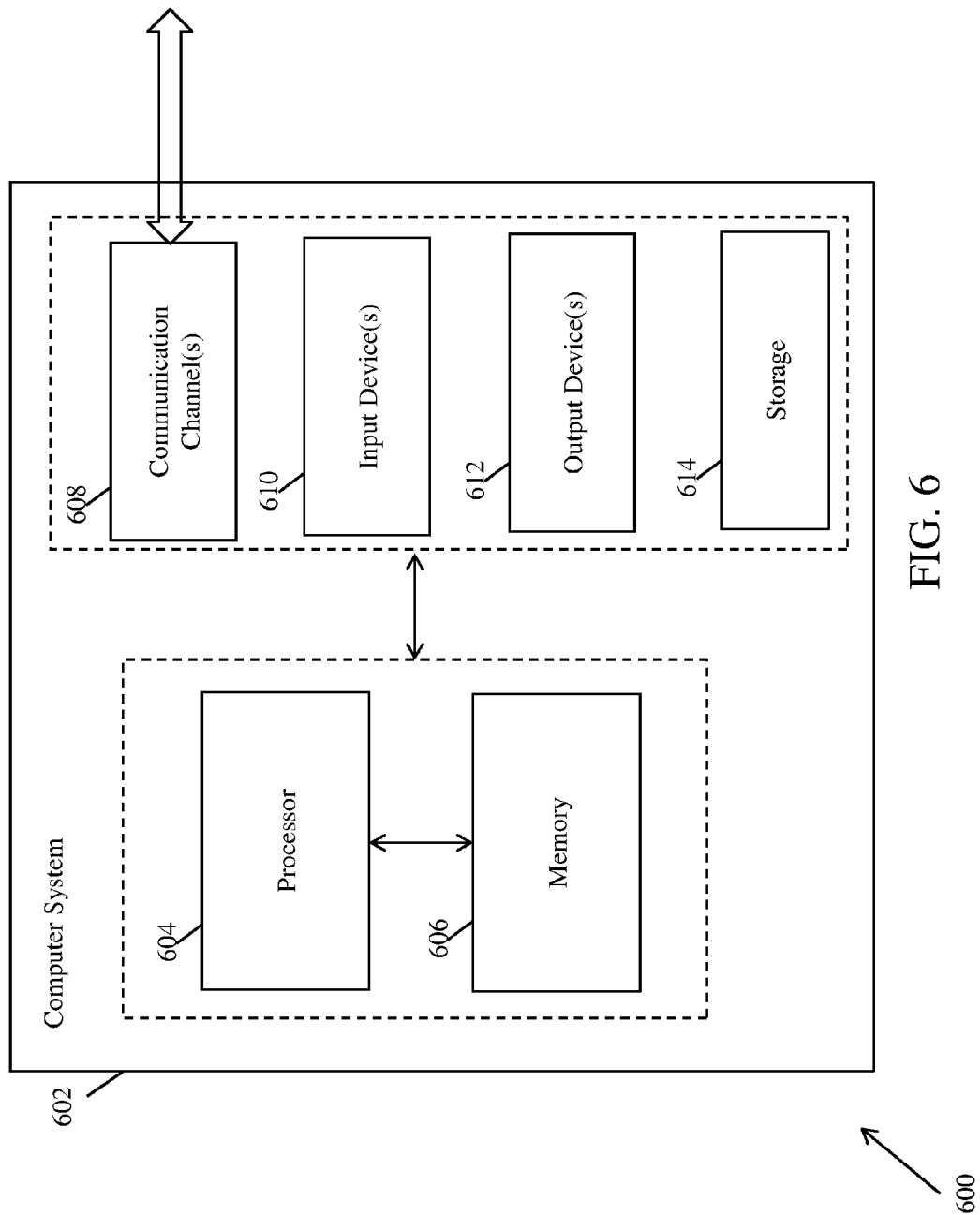
FIG. 6 illustrates an exemplary computer system in which various embodiments of the present invention may be implemented.

FIG. 6 illustrates an exemplary computer system in which various embodiments of the present invention may be implemented.

The computer system 602 comprises a processor 604 and a memory 606. The processor 604 executes program instructions and may be a real processor. The processor 604 may also be a virtual processor. The computer system 602 is not intended to suggest any limitation as to scope of use or functionality of described embodiments. For example, the computer system 602 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 606 may store software for implementing various embodiments of the present invention. The computer system 602 may have additional components. For example, the computer system 602 includes one or more communication channels 608, one or more input devices 610, one or more output devices 612, and storage 614. An interconnection mechanism (not shown) such as a bus, controller, or network, interconnects the components of the computer system 602. In various embodiments of the present invention, operating system software (not shown) provides an operating environment for various softwares executing in the computer system 602, and manages different functionalities of the components of the computer system 602.

The communication channel(s) 608 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 610 may include, but not limited to, a keyboard, mouse, pen, joystick, trackball, a voice device, a scanning device, or any another device that is capable of providing input to the computer system 602. In an embodiment of the present invention, the input device(s) 610 may be a sound card or similar device that accepts audio input in analog or digital form. The output device(s) 612 may include, but not limited to, a user interface on CRT or LCD, printer, speaker, CD/DVD writer, or any other device that provides output from the computer system 602.

The storage 614 may include, but not limited to, magnetic disks, magnetic tapes, CD-ROMs, CD-RWs, DVDs, flash drives or any other medium which can be used to store information and can be accessed by the computer system 602. In various embodiments of the present invention, the storage 614 contains program instructions for implementing the described embodiments.

The present invention may suitably be embodied as a computer program product for use with the computer system 602. The method described herein is typically implemented as a computer program product, comprising a set of program instructions which is executed by the computer system 602 or any other similar device. The set of program instructions may be a series of computer readable codes stored on a tangible medium, such as a computer readable storage medium (storage 614), for example, diskette, CD-ROM, ROM, flash drives or hard disk, or transmittable to the computer system 602, via a modem or other interface device, over either a tangible medium, including but not limited to optical or analogue communications channel(s) 608. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A system for hosting one or more mobile devices on one or more servers in a cloud computing environment for testing one or more mobile applications, the system comprising:
   one or more client virtualization managers, residing in the one or more mobile devices, configured to collect and send information related to the one or more mobile devices to the one or more servers to facilitate hosting of the one or more mobile devices;
   one or more mobile devices virtualization managers, residing in the one or more servers, configured to receive and use the information related to the one or more mobile devices to establish a connection with the one or more client virtualization managers for accessing and hosting the one or more mobile devices;

a server application configured to facilitate one or more testers to select a mobile device from a list of the one or more hosted mobile devices rendered on the server application; and an automation tool interface handler configured to:
virtualize Universal Serial Bus (USB) port of one or more local machines connected to the one or more servers;
connect the selected mobile device to the virtualized USB port of the one or more local machines, such that the selected mobile device is locally available for use on the one or more local machines; and
facilitate testing of the one or more mobile applications on the locally available mobile device by one or more test automation tools.

2. The system of claim 1 further comprising one or more client applications configured to provide one or more options to one or more users for hosting the one or more mobile devices on the one or more servers.

3. The system of claim 1, wherein the one or more client virtualization managers comprise:
a client device enumerator configured to identify and collect the information related to the mobile device;
a client connection manager configured to establish the connection for hosting the mobile device and maintaining the connection between the hosted mobile device and the one or more servers using the collected information;
a device session manager configured to initiate and maintain a session between the hosted mobile device and a server once the connection is established; and
a client events handler configured to:
facilitate encrypting and decrypting one or more requests associated with one or more hosted mobile device specific operations when the session is in progress; and
forward the one or more encrypted and decrypted requests to a client kernel services module, residing in the mobile device, for performing the one or more hosted mobile device specific operations associated with the one or more encrypted and decrypted requests.

4. The system of claim 3, wherein the one or more hosted mobile device specific operations associated with the one or more requests include at least one of: placing a call, sending an SMS message, downloading and using an application, testing of the one or more mobile applications and any other device specific operation initiated by the one or more test automation tools.

5. The system of claim 3, wherein the server application facilitates the one or more test automation tools to use the hosted mobile device selected by the one or more testers for testing by:
initiating the session with the client virtualization manager of the hosted mobile device to be used for testing of the one or more mobile applications; and
sending the one or more requests, associated with the testing of the one or more mobile applications, to the client virtualization manager once the session is initiated, wherein the one or more requests correspond to the one or more hosted mobile device specific operations initiated by the one or more test automation tools.

6. The system of claim 5, wherein the one or more mobile devices virtualization managers comprise:
a server enumerator configured to receive information related to the one or more mobile devices from the one or more client virtualization managers;
a server connection manager configured to ensure connectivity of the server with the one or more hosted mobile devices using the received information;
a server session manager configured to initiate and maintain the session between the one or more hosted mobile devices connected to the server; and
a server events handler configured to encrypt and decrypt the one or more requests associated with the one or more hosted mobile device specific operations initiated by the one or more test automation tools when the session is in progress.

7. The system of claim 1, wherein the information related to the one or more mobile devices include at least one of: model number, manufacturing details, Operating System (OS) version details, location details and carrier details.

8. The system of claim 1, wherein the one or more test automation tools reside in the one or more local machines.

9. The system of claim 1, wherein the one or more test automation tools are connected to the one or more local machines.

10. A computer-implemented method for hosting one or more mobile devices on one or more servers in a cloud computing environment for testing one or more mobile applications, via program instructions stored in a memory and executed by a processor, the computer-implemented method comprising:
capturing and sending information related to the one or more mobile devices to the one or more servers to facilitate hosting of the one or more mobile devices;
receiving and using, at the one or more servers, the information related to the one or more mobile devices to establish a connection for accessing and hosting the one or more mobile devices;
facilitating one or more testers to select, via one or more local machines, a mobile device from a list of the one or more hosted mobile devices rendered on a server application;
virtualizing Universal Serial Bus (USB) port of the one or more local machines connected to the one or more servers;
connecting the selected mobile device to the virtualized USB port of the one or more local machines, such that the selected mobile is locally available for use on the one or more local machines; and
facilitating testing of the one or more mobile applications on the locally available mobile device by one or more test automation tools.

11. The computer-implemented method of claim 10 further comprising providing one or more options, via a client application, to one or more users for hosting the one or more mobile devices on the one or more servers.

12. The computer-implemented method of claim 11, wherein facilitating testing of the one or more mobile applications on the locally available mobile device by the one or more test automation tools comprise:
encrypting and decrypting one or more requests associated with one or more hosted mobile device specific operations when a session is in progress, wherein the one or more hosted mobile device specific operations are initiated by the one or more test automation tools; and
forwarding the one or more encrypted and decrypted requests to a client kernel services module, residing in the mobile device, for performing the one or more hosted mobile device specific operations associated with the one or more encrypted and decrypted requests.

13. The computer-implemented method of claim 12, wherein the one or more hosted mobile device specific operations associated with the one or more requests include at least one of: placing a call, sending an SMS message, downloading and using the one or more mobile applications, testing of the one or more mobile applications and any other device specific operation performed by the one or more test automation tools.

14. A computer program product for hosting one or more mobile devices on one or more servers in a cloud computing environment for testing one or more mobile applications, the computer program product comprising:

a non-transitory computer-readable medium having computer-readable program code stored thereon, the computer-readable program code comprising instructions that when executed by a processor, cause the processor to:

capture and send information related to the one or more mobile devices to the one or more servers to facilitate hosting of the one or more mobile devices;

receive and use, at the one or more servers, the information related to the one or more mobile devices to establish a connection for accessing and hosting the one or more mobile devices;

facilitate one or more testers to select, via one or more local machines, a mobile device from a list of the one or more hosted mobile devices rendered on a server application;

virtualize Universal Serial Bus (USB) port of the one or more local machines connected to the one or more servers;

connect the selected mobile device to the virtualized USB port of the one or more local machines, such that the selected mobile is locally available for use on the one or more local machines; and facilitate testing of the one or more mobile applications on the locally available mobile device by one or more test automation tools.

15. The computer program product of claim 14 further comprising providing one or more options, via a client application, to one or more users for hosting the one or more mobile devices on the one or more servers.

* * * * *